United States Patent
Schween et al.

(10) Patent No.: US 11,202,329 B2
(45) Date of Patent: Dec. 14, 2021

(54) COMMUNICATION SYSTEM FOR USE WITH GUIDED GROUPS

(71) Applicants: Donald Paul Schween, Gilbert, AZ (US); Bruce Porter, Queen Creek, AZ (US); Jason Allred, Santaquin, UT (US)

(72) Inventors: Donald Paul Schween, Gilbert, AZ (US); Bruce Porter, Queen Creek, AZ (US); Jason Allred, Santaquin, UT (US)

( * ) Notice: Subject to any disclaimer, the term of this patent is extended or adjusted under 35 U.S.C. 154(b) by 74 days.

(21) Appl. No.: 16/719,520

(22) Filed: Dec. 18, 2019

(65) Prior Publication Data

US 2020/0196367 A1 Jun. 18, 2020

Related U.S. Application Data

(60) Provisional application No. 62/781,232, filed on Dec. 18, 2018.

(51) Int. Cl.
| | |
|---|---|
| *H04L 12/28* | (2006.01) |
| *H04W 76/15* | (2018.01) |
| *H04W 4/021* | (2018.01) |
| *H04J 1/16* | (2006.01) |
| *H04W 84/12* | (2009.01) |

(52) U.S. Cl.
CPC .......... *H04W 76/15* (2018.02); *H04W 4/021* (2013.01); *H04W 84/12* (2013.01)

(58) Field of Classification Search
CPC ........ H04W 4/021; H04W 4/80; H04W 84/12
USPC ....................... 370/252, 329, 386
See application file for complete search history.

(56) References Cited

U.S. PATENT DOCUMENTS

| | | | |
|---|---|---|---|
| 2015/0339917 A1* | 11/2015 | Messing | G08C 17/02 340/12.5 |
| 2019/0124401 A1* | 4/2019 | Lentner | H04N 21/485 |
| 2019/0364492 A1* | 11/2019 | Azizi | H04W 48/16 |

* cited by examiner

*Primary Examiner* — John Pezzlo
(74) *Attorney, Agent, or Firm* — Schmeiser, Olsen & Watts LLP

(57) ABSTRACT

Provided is a digital wireless private communication platform for use with groups. The communication platform includes a hub device, a lead device and a plurality of group devices. The hub device may establish an independent dedicated Wi-Fi network and may be configured to receive multiple inputs and multiple outputs. The lead device may operate a lead mobile application that couples the lead device to the hub device. The plurality of group device may operate group mobile applications that couple the plurality of group devices to the hub device. The hub device establishes the independent dedicated Wi-Fi network for connecting the lead device with the plurality of group devices and establishes a private communication link between the lead device and the plurality of group devices.

11 Claims, 4 Drawing Sheets

COMMUNICATION SYSTEM FOR USE WITH GUIDED GROUPS

CROSS REFERENCE TO RELATED APPLICATION[S]

This application claims priority to U.S. Provisional Patent Application entitled "COMMUNICATION SYSTEM FOR USE WITH GUIDED GROUPS," Ser. No. 62/781,232, filed Dec. 18, 2018, the disclosure of which is hereby incorporated entirely herein by reference.

BACKGROUND OF THE INVENTION

Technical Field

This invention relates generally to a communication system for groups and more particularly to a digital wireless private communication platform with a hub device establishing an independent dedicated Wi-Fi system for connecting a lead's device with devices of group members.

State of the Art

The tourism industry utilizes a common practice of guided tours that result in a guided group. These occur in urban areas as well as in rural environments. They often include a tour guide that utilizes a microphone, or some other way of magnifying the tour guide's voice for all to hear. In some instances, the guided tour may include hardware for tourists to use (earphones) that tie directly into a sound system for the tour guide and tourist to connect.

As guided tours increase in popularity in more exotic places, travel has become more complex, having concerns with regard to undesirable individuals and concerns about contraband crossing borders. Baggage checking has become more intrusive and more frequent in checking of baggage with scanner and inside viewing of bags and inspecting electronics. Conventional modes of communication within a guided group adds to the delays in checks as bordering and is cumbersome to say the least for guides to properly equip themselves for guided tours and are also unreliable. The drawbacks of the systems for tourism and other industries that utilize similar communication systems.

Accordingly, there is a need for an improved communication platform for use with groups that is digital, wireless and private.

SUMMARY OF THE INVENTION

The present invention relates to a communication system with a hub device establishing an independent dedicated Wi-Fi system for connecting a lead's device with devices of group members.

An embodiment includes a digital wireless private communication platform comprising: a hub device establishing an independent dedicated Wi-Fi network, the hub device configured to receive multiple inputs and multiple outputs; a lead device coupled to the hub device; and a plurality of group devices coupled to the hub device, wherein the hub device establishes the independent dedicated Wi-Fi network and broadcasts within a limited geographic area for connecting the lead device with the plurality of group devices and establishing a communication link between the lead device and the plurality of group devices.

Another embodiment includes a method of using a digital wireless private communication platform, the method comprising: activating a hub device thereby establishing an independent dedicated Wi-Fi network; coupling a lead device in response to operating a lead mobile application on the lead device; coupling a plurality of group devices to the hub device, wherein the hub device establishes the independent dedicated Wi-Fi network for connecting the lead device with the plurality of group devices and establishing a communication link between the lead device and the plurality of group devices; and communicating between the lead device and the plurality of group devices through the hub device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a digital wireless private communication platform with a hub device establishing an independent dedicated Wi-Fi system for connecting a lead's device with devices of group members.

As used herein, the term "lead" refers to a presenter, a speaker, a director, a professor, and instructor, a guide, and the like. Accordingly, embodiments of the invention may be utilized in various industries. One such industry is guided tours. The following is presented as an example of problems faced by existing systems within the tour guide industry. Such problems exist in other industries as well.

Tour guides in urban and rural regions experience many problems. This includes customers getting separated from their groups and require search parties. Older customers suffer from falling behind during tours but is not limited to examples of also having trouble hearing the guide and may cluster around the guide and increasing the distance and inconvenience for other tourists.

At the same time tourists and guides are given weight limits and size requirements for packing for air travel. Tourist find themselves more burdened than ever before when traveling. With these inconveniences comes an on-going demand for more convenient and safer travel.

The latest technology for tour operators has been developed by VoxNetwork USA (Ariz., Scottsdale) with the Whisper-Systems (Italy, Rome) being their only major competition. For a group, the tour guide must move an extra suitcase to the tour embarkation point. That suitcase has 45 receiver devices plus additional auxiliary equipment. Going into security-conscious countries is a challenge, nerve wracking and time-consuming task required by current available technology. Airport and customs automated screening regularly stop tour guides. The tour guide runs the gamut of security personnel who heavily screen electronics which creates undue stress for guides. Sometimes the transmission kits never make it to their final destination.

In order to address these problems, an improved digital wireless private communication platform has been developed according to an embodiment of the present invention. Because people bring their mobile devices on everywhere, embodiments of the communication platform utilizes mobile phones already used by individuals. The mobile devices and accessories have already been set to cater to the owners' various needs, including a variety of personal needs not least of which are sound needs and hearing communication through their mobile devices which they are accustom. Those hard of hearing are expected to be able to have optimized hearing, similar to nonimpaired individuals. This optimization of hearing through mobile devices that are already calibrated allows for the best use of resources to accomplish the communication needed by leads and their groups.

Figure 1:
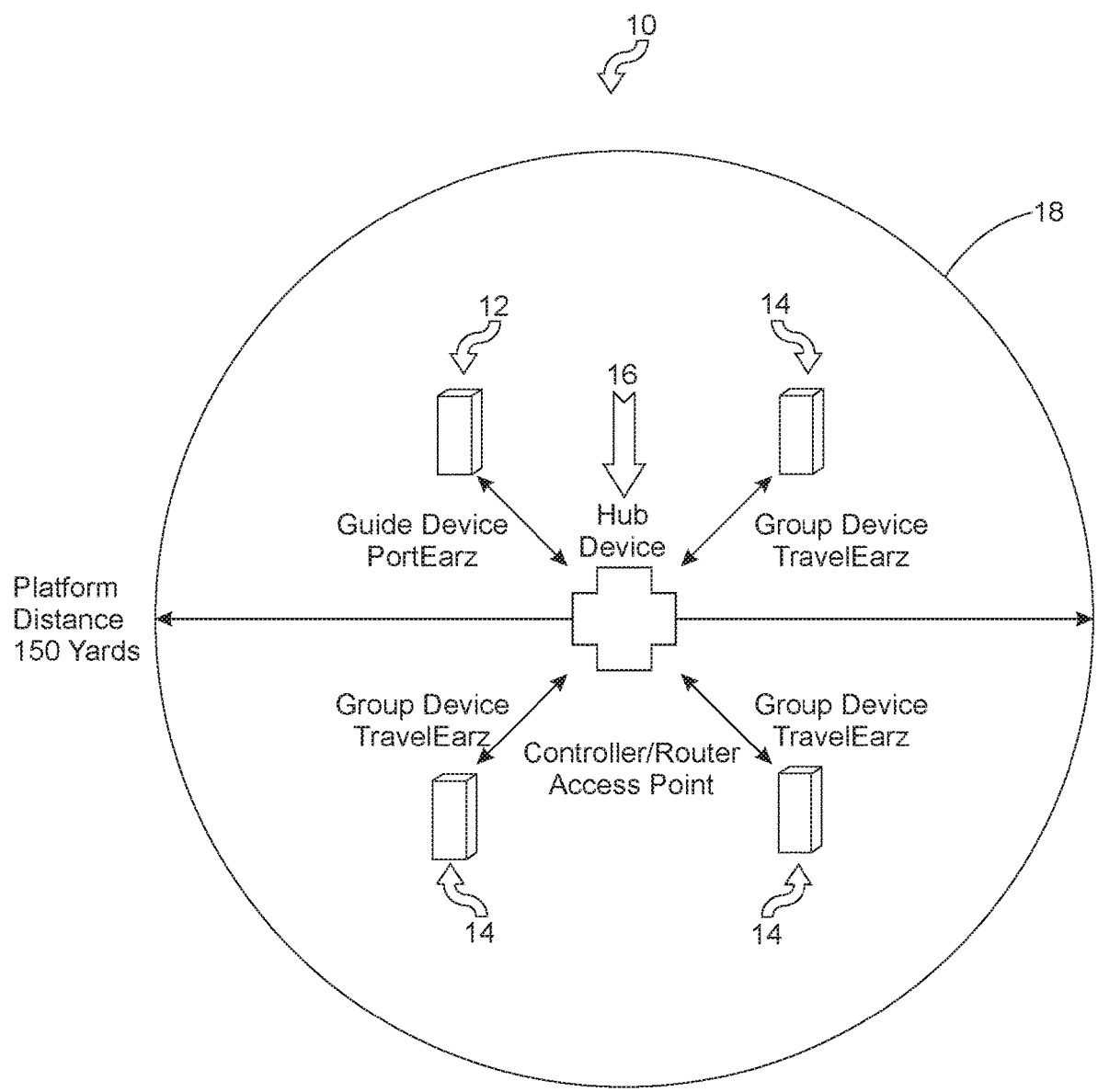
FIG. 1 is a diagrammatic view of a digital wireless private communication platform according to an embodiment.

Referring to FIG. 1, depicted is a diagrammatic view of a digital wireless private communication platform 10 for use with groups according to an embodiment. The communication platform 10 includes a lead device 12, a plurality of group devices 14 and a hub device 16. The lead device 12 and each of the group devices 14 may be a mobile device, such as a smartphone, a tablet or the like. Each of the mobile devices 12 and 14 include a Wi-Fi device 22 and 33 respectively for connecting to and communicating with another mobile device 12 or 14 through a Wi-Fi network established by the hub device 16.

The hub device 16 may be a hardware device that operates as a combined router, controller and access point. The hub device 16 may be plugged into a power source for power. Further, the hub device 16 may include a portable power source, such as, but not limited to, a rechargeable battery that can supply power to the hub device for operation that extends more than 8 hours. The lead device 12 operates a lead mobile application 13 and the group devices 14 operate a group mobile application 15.

Figure 2:
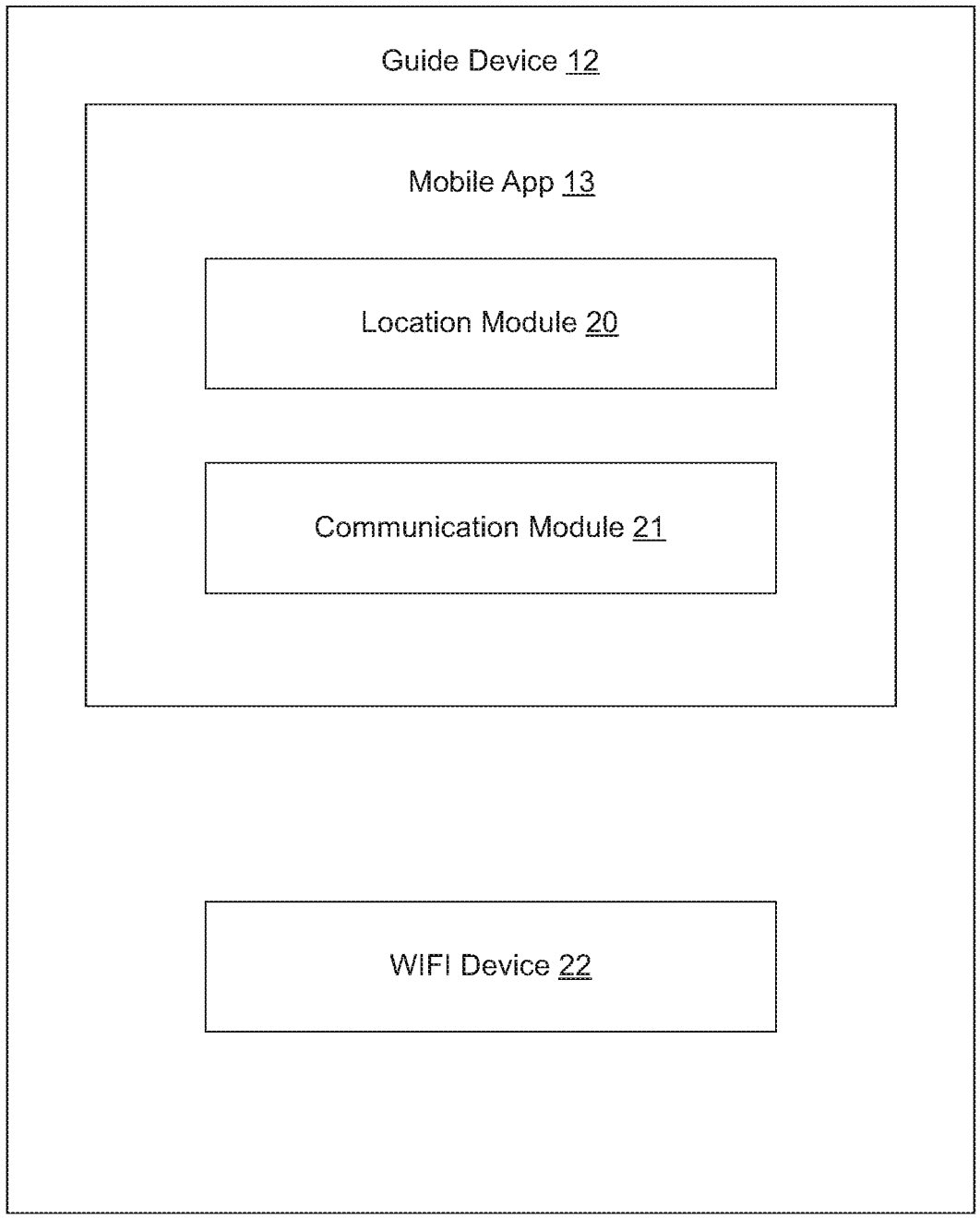
FIG. 2 is a diagrammatic view of a lead device of a digital wireless private communication platform according to an embodiment.
Figure 3:
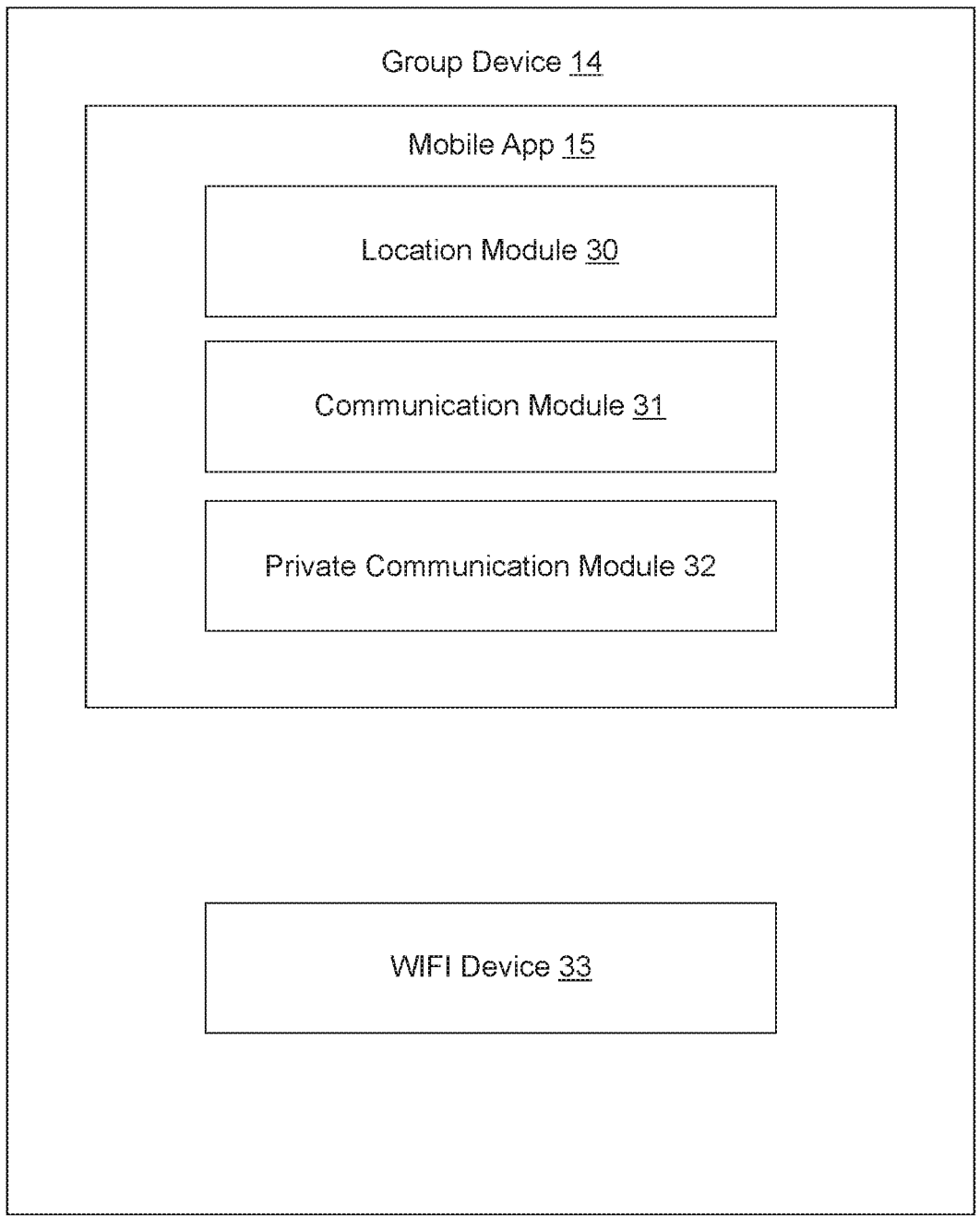
FIG. 3 is a diagrammatic view of a group device of a digital wireless private communication platform according to an embodiment.

Referring further to FIGS. 2 and 3, the operation of the lead mobile application 13, and the group application 15 by the respective devices, connect to the hub device 16 through a Wi-Fi connection established through Wi-Fi devices 22 and 33 of lead device 12 and group device 14, thereby creating a stand-alone private communication network or an independent dedicated Wi-Fi network. These are often referred to most recognizably as an IPLAN (Independent Private Local Area Network) or ISLAND (Independent Safe Local Area Network Device). This network is similar to a LAN (Local Area Network), but is limited in range and scope, while offering increased privacy and complete mobility. The hub device 16 establishes a communication link between the lead device 12 and the plurality of group devices 14, wherein the communications between lead sending communication and the group members receiving the communication are not dependent on cell towers, third party Wi-Fi networks or a power grid. This unique system 10 is a highly functional mobile communication platform that offers services never before available to owner operators (leads) and end users (group members).

The independent network created by the hub device 16 has an intended limited geographical space 18 of coverage and transmits to a limited number of recipients. For example, and without limitation, FIG. 1 depicts a predetermined limited geographical space 18 of a 150 ft radius around the hub device 16. It will be understood that the size of the geographical space 18 may greater or smaller than the 150 ft. radius depicted in FIG. 1. The entire communication platform 10 operates completely independent of other networks, but can offer the benefits previously tied into either a LAN (Local Area Network), and or, a WAN (Wide Area Network). The benefits offered in a mobile package become very attractive for a wide variety of users all of which have Smartphones and APPLICATIONs that enable them to easily connect with the IPLAN platform and to communicate by all means, including voice, audio and visual, video, and photo communication. This is a significant advantage over the existing systems that utilize FM signals to communicate by voice only over short distances between sender and receiver. The current technology does not equally compare with the wide variety of added functionality and additional revenue generation capabilities of this new IPLAN technology. It will be understood that while the system is independent of other on-line networks, it can still be fully integrated into other on-line networks when needed.

The communication platform 10 now provides Internet benefits that were previously limited due to local geographic, technologic or communication resources. Any individual may now become his or her own IP (Internet Provider) and may communicate privately with only those whom they give access, thereby providing security by limiting the devices that access the communication platform 10. This communication may include the sharing of content obtained using a connected device.

The communication platform 10 is completely mobile. Further, because the communication platform establishes an independent dedicated Wi-Fi network, there is greater security with may additional benefits. These benefits may include, without limitation, private communication, secured signals, encrypted communication, private texting, multilingual translation and isolation from nefarious activities, and the like. Additionally, because the hub device 16 is mobile, the limited geographical space 18 is also mobile. As part of the functionality of the system 10, the hub device 16 may have the hardware capabilities to transmit digital voice signals from device to device operating the apps 13 and 15 with latency of at least 200 milliseconds or less. The system 10 provides for private communication that is guaranteed when the system 10 is operating as an independent network and not connected to an Internet network.

In operation, the hub device 16 may be activated to establish an independent dedicated Wi-Fi network, and broadcasts within the limited geographic area 18 an SSID (service set identifier). The lead device 12 may operate the lead mobile application 13, wherein operation of the lead mobile application 13 automatically identifies the SSID and connects a Wi-Fi device 22 of the lead device 12 to the Wi-Fi network established by the hub device 16. The group devices 14 may each operate the group mobile application 15 on the group device 14, wherein operation of the group mobile application 15 automatically identifies the SSID and connects a Wi-Fi device 33 of the group device 14 to the Wi-Fi network established by the hub device 16. The operation of the lead mobile application 13 and the group mobile application 15 on the connected devices 12 and 14, respectively, allows for communication to be conducted between the connected devices 12 and 14 over the independent dedicated Wi-Fi network.

In an embodiment, the lead mobile application 13 may be programmed with a location module 20 and a communication module 21 and the group mobile application 15 may be programmed with a location module 30, a communication module 31 and a private communication module 32. The location module 30 may be executed by the group devices 14 to report location of the group device 14 within the area 18 and will track or determine if a group device 14 exits the area 18. The location module 20 of the lead device 12 may be executed by the lead device 12 in order to track location of the group devices 14 operating the location module 30 of the group mobile application 15. This allows the system 10 to identify if a user is separated from the group and allows the group to find the user that is separated and further, to not proceed without all group members within the limited geographical area 18.

Further, the communication module 21 operates to allow the lead device 12 to communicate with the networked group devices 14 through the hub 16, wherein the group device 14 are operating the communication modules 31 of the group mobile application 15. Additionally, the private communication module 22 of the group mobile application 15 may operate to establish a private communication between two or more group devices 14, wherein no other devices 12 or 14 may be a part of those communications. It will be understood that the communication modules 21, 31 and 33 may be utilized to transfer any type of data or communication, including, without limitation, text, voice, video, photo or the like.

Figure 4:
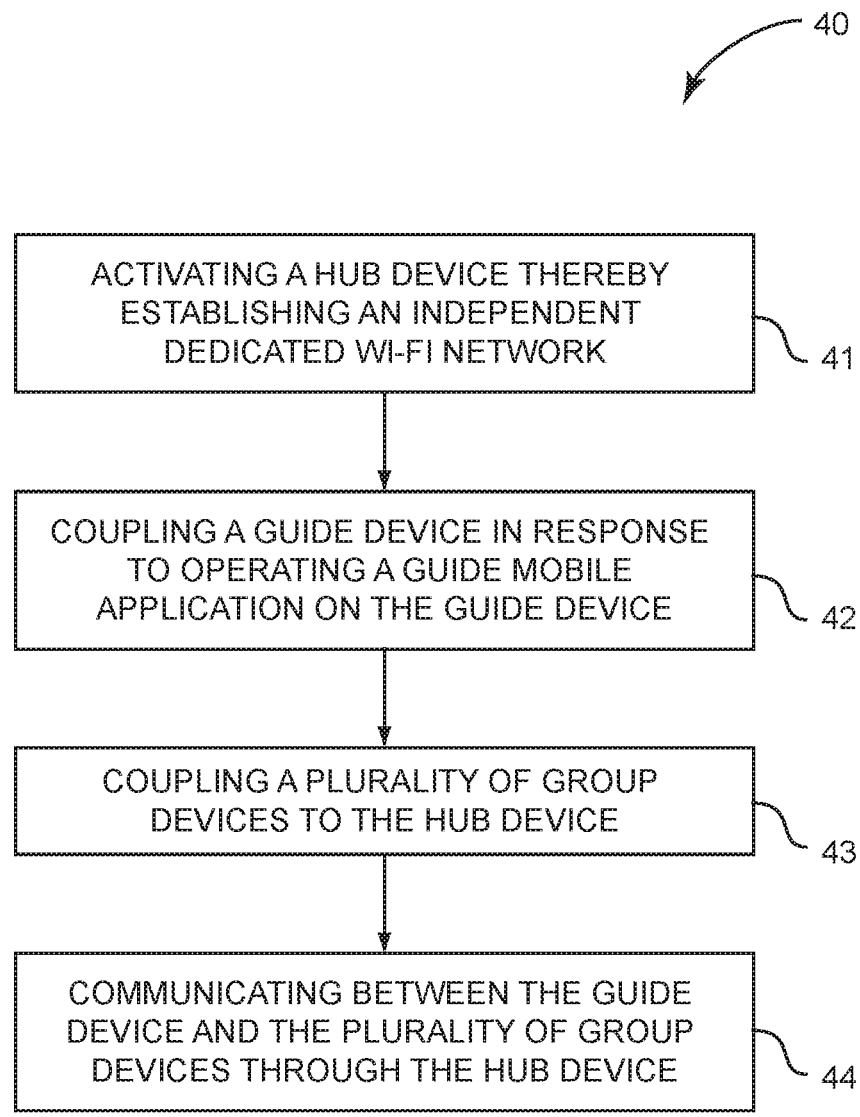
FIG. 4 is a flow chart depicting a method of using a digital wireless private communication platform according to an embodiment.

Referring again to the drawings, FIG. 4 depicts a method 40 of using a communication platform according to an embodiment. The method 40 may comprise activating a hub device thereby establishing an independent dedicated Wi-Fi network (Step 41); coupling a lead device in response to operating a lead mobile application on the lead device (Step 42); coupling a plurality of group devices to the hub device (Step 43), wherein the hub device establishes the independent dedicated Wi-Fi network for connecting the lead device with the plurality of group devices and establishing a communication link between the lead device and the plurality of group devices; and communicating between the lead device and the plurality of group devices through the hub device (Step 44).

In embodiments, the method 40 may further comprise establishing a private communication connection between two or more of the plurality of group devices; and sending communications between the two or more of the plurality of group devices through the private communication connection.

The method 40 may also comprise establishing a limited geographic area for broadcasting the Wi-Fi network, wherein the limited geographic area is a predetermined radius around the hub device, wherein the hub device is portable. The method 40 may include tracking the location of the plurality of group devices on the lead device; and receiving an alert at the lead device if a group device of the plurality of group devices travels outside of the limited geographic area.

SYSTEM EXAMPLE

The following provides an example of a communication platform for groups, but is not to be construed as a limitation to the system:

The system 10 is a unique combination of mobile applications, software and network hardware technology.

The system 10 is a combination of two separate applications 13 and 15 that communicate directly with one another through advanced hardware technology. The mobile applications 13 and 15 provide the transmitting and receiving components of this unique communication platform. The application(s) 13 and 15 coupled with a hub 16 that may be a ruggedized mobile high-tech access, router, controller, networking hardware device, creates a unique combination of technology that makes the system independent, private and mobile. This combination of application(s) 13 and 15 and hardware technology, such as lead device 12, group device 14 and hub 16, produces a closed Wi-Fi communication platform—a self-contained hot spot. A communication network that is its own platform while mobile, but can be fully integrated into other on-line networks when needed. This is a combination of technology in different ways depending on the various features offered in the application (s) 13 and 15 and its application in the market, such as:
 a. MPLAN—Mobile Personal Local Area Network
 b. IPLAN—Independent Private Local Area Network
 c. ISLAND—Independent Safe Local Area Network Device This self-contained digital communication platform may have a small footprint, ranging from a minimum of 30 feet to 300 yards in diameter. This technology may make the use of local Internet network connections, WI-FI or cell tower connections no longer necessary to accomplish communication between the APPs. Direct communication between hand-held computer devices (smart phones) can now be done without outside network assistance. The system 10 may be designed to transmit to a plurality of end users simultaneously.

While streaming data between devices is currently possible, and the use of mobile devices to daisy chain a signal, or the use of blue tooth transmissions is available technology, transmitting a live voice signal real time, and or data signals real time, without the assistance of an outside network source with little to know latency, was not available prior to this invention.

There are a wide variety of applications for this unique communication platform. The technology will be initially introduced to the travel industry. Other professions and industries with similar needs as travel guides will find the benefits of the technology superior to currently used communication systems. The system provides a significant advantage over similar communication equipment because of the mobile application to mobile application connection while mobile, but also when connected to an on-line network.

The system 10 operates to revolutionize direct communication between smart phones or other mobile computing devices by offering various features, which previously were not accessible. This form of direct communication provides numerous benefits for both transmitter and receiver, but most importantly it allows the transmitter to monetize the connection with the receiver's opt in permission before, during and after the application has been installed.

Specific unique aspects of the system 10 hardware features may include:
 a. A digital wireless audio voice communication platform.
 b. A digital private bi-directional texting platform.
 c. A closed communication platform.
 d. A private wireless communication platform.
 e. A mobile wireless communication platform.
 f. A secure/safe communication platform running independent of internet or cell communication towers.

Application communicating directly to another application via local hardware device(s):
  a. Smartphone to Router/Access Point/Controller back to Smartphone.
  b. The platform is designed to be completely mobile.
  c. The platform is designed to communicate independent of common carrier(s) i.e., cell towers and local WI-FI signals.
  d. The invention is designed to run off a self-contained batter powered system and not be dependent upon any power grid.
  e. The platform is designed to interface with on-line communication platform when not running as a independent mobile platform.

Application(s) Features (While operating as an independent local area network):
  a. A tracking device for locating all participants in the network.
  b. Transmitter tracks and alerts participants.
  c. Data sharing between transmitter and the receiver, between sender receiver and all additional participants within the network.
  d. Push notification communications from transmitter to receiver e.g., marketing, itineraries, daily schedules, excursion etc.
  e. A private chat room for participant.
  f. A private photo or file sharing channel between participants in the network.

Application(s) features (While connected with an on-line system):
  a. Push notification communications from transmitter company to receiver.
  b. Channel for delivering instructional training, promotional and general Information from the company/transmitter (lead) to participant(s) Before, during and after initial installation of receiver application.
  c. Back up Information storage (Transmitter [lead] for participants).
  d. Photo/Video storage platform for participants [access point device].
  e. Alerts/Notifications, meetings, gatherings, departure times, return times and all other necessary intermediary communications.
  f. Video Messaging of itinerary, Lead's background, excursion available.
  g. Device for expediting gratuity for leads.
  h. Emergency Information storage, emergency family contacts, current passport information, dietary, foreign embassy information, etc.

The embodiments and examples set forth herein were presented in order to best explain the present invention and its practical application, and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A digital wireless private communication platform comprising:
  a hub device establishing an independent dedicated Wi-Fi network, the hub device configured to receive multiple inputs and multiple outputs, wherein the hub device is hardware that operates as a router, a controller and an access point;
  a lead device coupled to the hub device, wherein the lead device is a smartphone, wherein the lead device comprises a lead mobile application operating on the lead device, wherein the lead mobile application comprises a location module and a communication module;
  a plurality of group devices coupled to the hub device, wherein the plurality of group devices are smartphones, wherein each of the plurality of group devices comprises a group mobile application operating on the group device, wherein the group mobile application comprises a location module, a communication module and a private communication module, wherein the hub device establishes the independent dedicated Wi-Fi network and broadcasts within a limited geographic area for connecting the lead device with the plurality of group devices and establishing a communication link between the lead device and the plurality of group devices.

2. The platform of claim 1, wherein the lead device and the plurality of lead devices communicate with each other by operation of the communication module.

3. The platform of claim 1, wherein two or more of the plurality of group devices operate the private communication module to establish a private communication connection between the two or more of the plurality of group devices.

4. The platform of claim 3, wherein the private communication connection allows for communication between only the group devices with the established communication connection.

5. The platform of claim 1, wherein operation of the location module of the lead mobile application and the location modules on the plurality of group devices comprises the location module tracking location of the plurality of group devices and receiving an alert if a group device of the plurality of group devices travels outside of the limited geographic area.

6. The platform of claim 1, wherein the limited geographic area comprises a predetermined radius around the hub device, wherein the hub device is portable.

7. A method of using a digital wireless private communication platform, the method comprising:
  activating a hub device thereby establishing an independent dedicated Wi-Fi network;
  coupling a lead device in response to operating a lead mobile application on the lead device;
  coupling a plurality of group devices to the hub device, wherein the hub device establishes the independent dedicated Wi-Fi network for connecting the lead device with the plurality of group devices and establishing a communication link between the lead device and the plurality of group devices; and
  communicating between the lead device and the plurality of group devices through the hub device;
  establishing a private communication connection between two or more of the plurality of group devices; and
  sending communications between the two or more of the plurality of group devices through the private communication connection.

8. The method of claim 7, wherein the hub device is configured to receive multiple inputs and multiple outputs.

9. The system of claim 7, further comprising establishing a limited geographic area for broadcasting the Wi-Fi network, wherein the limited geographic area is a predetermined radius around the hub device, wherein the hub device is portable.

10. The method of claim 9, further comprises tracking the location of the plurality of group devices on the lead device.

11. The method of claim 10, further receiving an alert at the lead device if a group device of the plurality of group devices travels outside of the limited geographic area.

\* \* \* \* \*